Patented Feb. 2, 1937

2,069,365

UNITED STATES PATENT OFFICE 2,069,365

FLOTATION REAGENT

Royal S. Handy, Kellogg, Idaho

No Drawing. Application September 30, 1935,
Serial No. 41,423

2 Claims. (Cl. 252—9)

This invention relates to improvements in conditioning agents adapted for use in the flotation of ore, and this application is a continuation in part of my application filed July 18, 1934, Serial No. 735,862, for improvement in Concentration of ores.

One of the objects of this invention is to provide a conditioning agent or compound which also acts and functions as a frothing agent.

A further object is to provide a conditioning agent that is highly efficient in serving to activate and float the oxide ore particles after the sulphide ore particles have been frothed off.

A very special object is to provide a conditioning agent that is especially efficient in floating oxide ore particles in a pulp from which the natural colloids have been deflocculated or removed.

In the most preferred form of the invention, my improved oxide conditioning and frothing compound consists of a frothing agent of cresylic acid and a conditioning agent of oleic acid, and these are combined with soda ash and sodium silicate to make them miscible with one another, and with water. Physically, the compound is in the form of a jelly, of amber color, which is miscible but not soluble in water.

The main function of the soda ash is to saponify the oils, and the sodium silicate homogenizes the mass. As stated, the primary function of this improved compound in a flotation process is to float the oxide minerals, as distinguished from the sulphide minerals, and in this connection, it is highly useful in floating carbonates, such as cerussite, rhodochrosite, malachite; oxides, such as cassiterite, rutile; tungstates, such as scheelite, wolframite; sulphates, such as anglesite, barite; chlorides, such as halite; sylvite; fluorides, such as cryolite and fluorite; and native metals such as gold, silver and copper.

One specific composition of my improved compound, which is previously prepared before being added to the pulp, consists of the following ingredients:

| | Percent by weight |
|---|---|
| Oleic acid | 57.1 |
| Cresylic acid | 28.7 |
| Soda ash | 7.1 |
| Sodium silicate | 7.1 |

While the improved compound is effective irrespective of the specific percentages previously set forth, to which I do not wish to be limited, I have found in actual practice that it is far more efficient if compounded in a manner which I shall next set forth.

The cresylic acid and oleic acid are mixed together and I next stir slowly into this mixture a ten percent solution of soda ash in water. If the soda ash solution is added too rapidly, the whole compound will froth in an objectionable manner. I next stir in a ten percent solution of sodium silicate, in water, which forms an amber jelly, the latter being the reagent. For convenience, I use this reagent in a ten percent emulsion in water.

I will next give specific examples of assays resulting from the use of this compound.

A sample of an oxide lead ore, composed principally of iron oxide and lead carbonate (cerussite) was ground with water in a laboratory rod-mill to pass one hundred mesh, and the ground pulp was diluted with water and deflocculated by the addition of sodium silicate to the pulp, in the proportion of 2 pounds per ton of ore. The liquid containing the natural colloidal matter thus separated from the crystalline matter, was removed by decantation and the residual crystalline matter was diluted to 40% solids, with water. The resulting sands were floated by the addition of a quantity of my improved compound, in the proportion of two pounds per ton of ore, with the following results:

Assay 1

| Product | Percent Wt. | Percent Pb | Units of lead | Percent total lead |
|---|---|---|---|---|
| Concentrates | 35.1 | 65.8 | 23.096 | 85.9 |
| Cleaner tailings | 32.8 | 8.7 | 2.853 | 10.5 |
| Tailings | 32.1 | 3.0 | 0.968 | 3.6 |
| Total | 100.0 | 26.9 | 26.917 | 100.0 |

A Bolivian ore containing cassiterite was treated as follows:

A sample was ground to pass one hundred mesh in size and the ground pulp was deflocculated with sodium silicate and decolloided by decantation. The resulting sands were floated with this compound and the rougher concentrate was cleaned, with the following result:

Assay 2

| Product | Percent Wt. | Percent Sn | Units tin | Percent total tin |
|---|---|---|---|---|
| Concentrate | 14.7 | 50.40 | 7.405 | 92.4 |
| Cleaner tailings | 17.9 | 3.13 | .561 | 7.0 |
| Tailings | 67.4 | 0.07 | .046 | 0.6 |
| Total | 100.0 | 8.01 | 8.012 | 100.0 |

A sample of ore containing wolframite was ground to pass one hundred mesh in size, and the ground pulp was deflocculated and de-colloided. The resulting sands were floated first with cresylic acid and xanthate to produce a sulphide concentrate, which was removed, and the residue was floated with this compound to produce a wolframite concentrate, which was cleaned.

The result follows:

*Assay 3*

| Product | Percent Wt. | Assay WO$_3$ | Contents units WO$_3$ | Total WO$_3$ |
|---|---|---|---|---|
| Sulphide concentrate | 2.00 | 0.50 | 0.010 | 0.7 |
| Wolframite concentrate | 1.85 | 69.00 | 1.275 | 84.1 |
| Cleaner tailings | 11.40 | 0.73 | 0.084 | 5.5 |
| Tailings | 80.15 | 0.08 | 0.064 | 4.2 |
| Slime | 4.60 | 1.78 | 0.082 | 5.5 |
| Total | 100.00 | 1.51 | 1.515 | 100.0 |

A sample of an oxide ore containing free gold was ground to pass 48-mesh in size, and the ground pulp was deflocculated and de-colloided by decantation. The resulting sands were floated with this compound and the concentrate was cleaned once by flotation.

The result follows:

*Assay 4*

| Product | Percent Wt. | Oz. Au | Units gold | Percent total gold |
|---|---|---|---|---|
| Concentrate | 5.7 | 14.10 | 80.370 | 69.1 |
| Cleaner tailing | 9.3 | 1.46 | 13.578 | 11.8 |
| Rougher concentrate | 15.0 | 6.26 | 93.948 | 80.9 |
| Tailing | 74.5 | 0.21 | 15.768 | 13.5 |
| Slime | 10.5 | 0.62 | 6.510 | 5.6 |
| Total | 100.0 | 1.16 | 116.226 | 100.0 |

Although this reagent is more efficient in a deslimed pulp, yet its use is not necessarily confined to such pulps, particularly with respect to the flotation of gold and reluctant sulphides.

The following test is a case in point and the reagent has been used in this manner in commercial operations with very great success.

The sample was ground to pass one hundred mesh in the presence of GNS oils No. 25 and 28, and the sulphides were floated with the addition of 0.2 lb. per ton of ethyl xanthate. A second sample was treated in an identical manner, except that after the sulphides had been floated to completion by this treatment, the compound was added in the proportion of 0.3 lb. per ton, and additional sulphides were floated. The concentrates were cleaned by flotation and the result follows:

*Assay 5*

| Product | Percent Wt. | Assay Oz. Au | Units gold | Percent total gold |
|---|---|---|---|---|
| Concentrate | 26.0 | 1.12 | 29.12 | 84.4 |
| Cleaner tailings | 9.8 | 0.16 | 1.57 | 4.5 |
| Rougher concentrate | 35.8 | 0.86 | 30.69 | 88.9 |
| Tailing No. 1 (without compound) | 31.9 | 0.08 | 2.55 | 7.4 |
| Tailing No. 2 (with compound) | 32.3 | 0.04 | 1.29 | 3.7 |
| Total | 100.0 | 0.34 | 34.53 | 100.0 |

It is believed that the difference in the gold content of the two above tailings is due to the flotation of the reluctant sulphides by the use of this improved compound. Therefore, this compound is of great value in floating such minerals as sulphides, which are reluctant to float under favorable sulphide flotation, doubtless by reason of the formation of an oxide film, although I have been able to float such minerals as "rusty" native gold, which is very reluctant to float.

It is believed that the nature and function of my improved compound will be fully understood from the foregoing description, but I do not wish to be limited thereto except for such limitations as the claims may import.

I claim:

1. As a new and useful product of the class described, a compounded conditioning and frothing reagent for flotation treatment of oxide ore, comprising, oleic acid, cresylic acid, soda ash and sodium silicate, thoroughly mixed and in the form of a water miscible jelly.

2. As a new and useful product of the class described, a compounded conditioning and frothing reagent for flotation treatment of oxide ore, comprising, oleic acid 57.1% by weight, cresylic acid 28.7% by weight, soda ash 7.1% by weight, and sodium silicate 7.1% by weight, thoroughly mixed and in the form of a jelly that is miscible in water in any proportion.

ROYAL S. HANDY.